(12) United States Patent
Kato

(10) Patent No.: US 10,213,789 B2
(45) Date of Patent: Feb. 26, 2019

(54) CRUSHING/BLASTING DEVICE, MILLING METHOD, CEREAL FLOUR, FOOD PRODUCT, AND ADHESIVE

(71) Applicants: Susumu Kato, Sapporo-shi, Hokkaido (JP); Kato Biomass Technology Co., Ltd., Sapporo-shi, Hokkaido (JP)

(72) Inventor: Susumu Kato, Hokkaido (JP)

(73) Assignee: Kato Biomass Technology Co., Ltd., Hokkaido (JP)

( * ) Notice: Subject to any disclaimer, the term of this patent is extended or adjusted under 35 U.S.C. 154(b) by 212 days.

(21) Appl. No.: 15/035,737

(22) PCT Filed: Nov. 10, 2014

(86) PCT No.: PCT/JP2014/079727
§ 371 (c)(1),
(2) Date: May 10, 2016

(87) PCT Pub. No.: WO2015/068838
PCT Pub. Date: May 14, 2015

(65) Prior Publication Data
US 2016/0279642 A1  Sep. 29, 2016

(30) Foreign Application Priority Data
Nov. 11, 2013 (JP) ................................. 2013-233198

(51) Int. Cl.
*B02C 19/22* (2006.01)
*A21D 13/043* (2017.01)
(Continued)

(52) U.S. Cl.
CPC .............. *B02C 19/22* (2013.01); *A21D 2/186* (2013.01); *A21D 13/04* (2013.01); *A21D 13/043* (2017.01);
(Continued)

(58) Field of Classification Search
CPC ................................. B02C 9/00; B02C 19/22
(Continued)

(56) References Cited

U.S. PATENT DOCUMENTS 2,509,379 A  *  5/1950  Vasel ...................... B01F 7/082
                                                      241/111
4,221,340 A  *  9/1980  dos Santos ............... B02C 9/00
                                                      241/260.1
(Continued)

FOREIGN PATENT DOCUMENTS

JP    S47-025103    7/1972
JP    S63-020950    2/1988
(Continued)

*Primary Examiner* — Faye Francis
(74) *Attorney, Agent, or Firm* — K&L Gates LLP; Louis C. Cullman; Georgia N. Kefallinos

(57) ABSTRACT

Generally, described herein are milling devices. A milling device (100) includes a rotatable screw (110) in an outer periphery of which spiral grooves (110a, 110b) are formed; a barrel (120) surrounding the portion of the screw (110) where the spiral grooves (110a, 110b) are formed and in an inner periphery of which a spiral groove (120a) is formed; a loader (130) for loading cereal grains into a space (135) between the screw (110) and barrel (120); a compressor (140) attached to a distal end of the barrel (120) and accumulating and pressurizing in a nearly airtight state the cereal grains ground in the space (135) and fed therein as the screw (110) rotates; and a discharge port (150) provided in a front face of the compressor (140) and blasting the cereal grains fed in and pressurized by way of rotation of the screw (110).

4 Claims, 4 Drawing Sheets

(51) Int. Cl.
*A21D 13/40* (2017.01)
*B02C 9/00* (2006.01)
*A21D 2/18* (2006.01)
*A21D 13/04* (2017.01)
*A23L 7/109* (2016.01)
*A23L 7/10* (2016.01)

(52) U.S. Cl.
CPC ............... *A21D 13/40* (2017.01); *A23L 7/10* (2016.08); *A23L 7/109* (2016.08); *B02C 9/00* (2013.01)

(58) Field of Classification Search
USPC ...................................................... 241/260.1
See application file for complete search history.

(56) References Cited

U.S. PATENT DOCUMENTS

| | | | | |
|---|---|---|---|---|
| 4,512,523 A | * | 4/1985 | Higashimoto | B02C 18/302 241/152.2 |
| 4,535,940 A | * | 8/1985 | Geng | B29B 17/0042 241/260.1 |
| 4,546,927 A | * | 10/1985 | Bloome | A22C 17/04 241/260.1 |
| 4,562,973 A | * | 1/1986 | Geng | B29B 17/0042 241/260.1 |
| 5,799,880 A | * | 9/1998 | Roberson | B29B 17/04 241/1 |
| 5,975,449 A | * | 11/1999 | Geyer | B29B 13/10 241/260.1 |
| 6,095,440 A | * | 8/2000 | Roberson | B29B 17/04 241/1 |
| 6,951,169 B2 | * | 10/2005 | Ohno | B02B 3/00 99/519 |
| 2015/0290895 A1 | * | 10/2015 | Daniellson | B02C 19/22 100/97 |

FOREIGN PATENT DOCUMENTS

| | | |
|---|---|---|
| JP | 3011473 | 3/1995 |
| JP | H10-075759 | 3/1998 |
| JP | H10-258241 | 9/1998 |
| JP | H11-302706 | 2/1999 |
| JP | 2001-017070 | 1/2001 |
| JP | 2005-021024 | 1/2005 |
| JP | 2008-214517 | 9/2008 |
| JP | 2009-013229 | 1/2009 |

* cited by examiner

CRUSHING/BLASTING DEVICE, MILLING METHOD, CEREAL FLOUR, FOOD PRODUCT, AND ADHESIVE

TECHNICAL FIELD

The present disclosure relates to a milling device, milling method, cereal flour, food product, and adhesive.

BACKGROUND ART

Cereal-based food products are essential for the diet of people nowadays. Such food products have a variety of forms including breads, noodles such as udon and pasta, pizza, dumpling and shumai wrappers, and sweets such as cakes and donuts.

Cereals must be transformed into dough for producing cereal-based food products. There are several reports on preparation of such dough and production of cereal-based food products.

Patent Literature 1 describes a method of imparting viscosity to rice flour by adding a given amount of gluten and producing noodles. Moreover, Patent Literature 2 describes a device comprising a screw and a barrel for producing cereal-based puffy food products. Moreover, Patent Literature 3 describes a method of producing breads using a gluten substitute from rice flour and thickeners. Moreover, Patent Literature 4 describes a method of producing bakery products using finely pulverized powder primarily including pregelatinized rice.

Moreover, traditionally, glues (adhesives) using cereals including rice have been used. There are several reports on such adhesives.

Patent Literature 5 describes an adhesive production method including the steps of gelatinizing sticky rice while stirring with a heater and stirrer and mixing in natural spices. Moreover, Patent Literature 6 describes a wood glue production method including the steps of cooking washed rices, mincing the cooked rices, introducing water-soluble additives (chitosan and the like) while stirring with a stirrer, and filtering through a strainer.

CITATION LIST

Patent Literature

Patent Literature 1: Unexamined Japanese Patent Application Kokai Publication No. H11-32706;
Patent Literature 2: Unexamined Japanese Patent Application Kokai Publication No. H10-75759;
Patent Literature 3: Unexamined Japanese Patent Application Kokai Publication No. 2005-021024;
Patent Literature 4: Unexamined Japanese Patent Application Kokai Publication No. 2001-017070;
Patent Literature 5: Unexamined Japanese Patent Application Kokai Publication No. 2008-214517; and
Patent Literature 6: Unexamined Japanese Patent Application Kokai Publication No. 2009-013229.

SUMMARY OF INVENTION

Technical Problem

However, the method described in Patent Literature 1 includes mixing gluten with rice powder and, therefore, not only has a disadvantage of increased production cost but also is against consumer needs calling for reduced food additives. Moreover, the device described in Patent Literature 2 is capable of producing puffy food products made from cereals, but cannot impart the viscosity to the extent of preparing dough. Moreover, the method described in Patent Literature 3 uses thickeners such as curdlan and xanthan gum and the method described in Patent Literature 4 adds gluten to prepare a thin layer of dough for bakery products; then, however, this contradicts the goal of reducing food additives. Moreover, the adhesive production methods described in Patent Literature 5 and 6 require a multistep production process and, therefore, have problems such as a prolonged time required to produce an additive and increased production cost.

The present disclosure is made with the view of the above situation and an objective of the disclosure is to provide a milling device, milling method, cereal flour, food product, and adhesive making it possible to grind and blast cereal grains in a short time and at low cost.

Solution to Problem

In order to achieve the above objective, the milling device according to a first exemplary aspect of the present disclosure comprises:
 a rotatable screw in an outer periphery of which spiral grooves are formed;
 a barrel surrounding the portion of the screw where the spiral grooves are formed and in an inner periphery of which a spiral groove is formed;
 a loader for loading cereal grains into a space between the screw and barrel;
 a compressor attached to a distal end of the barrel and accumulating and pressurizing in a nearly airtight state the cereal grains ground in the space and fed therein as the screw rotates; and
 a discharge port provided in a front face of the compressor and blasting the cereal grains fed in and pressurized by way of rotation of the screw.

The grooves of the screw may comprise a bottom surface, two lateral surfaces rising at given angles from the bottom surface, and a lateral surface rising at a given angle from at least one of the two lateral surfaces.

Non-rounded edges may be formed on the grooves of the screw.

The grooves of the screw may comprise grooves of different pitches.

Of the grooves of the screw, the groove near the distal end may have a smaller pitch than the groove near a rear end.

The milling method for cereals according to a second exemplary aspect of the present disclosure includes the following steps:
 grinding cereal grains in a space between a rotatable screw in an outer periphery of which spiral grooves are formed and a barrel surrounding the portion of the screw where the spiral grooves are formed and in an inner periphery of which a spiral groove is formed by way of the screw and barrel;
 blasting the ground cereal grains; and
 pulverizing the blasted cereal grains.

The grooves of the screw may comprise a bottom surface, two lateral surfaces rising at given angles from the bottom surface, and a lateral surface rising at a given angle from at least one of the two lateral surfaces.

Non-rounded edges may be formed on the grooves of the screw.

The grooves of the screw may comprise grooves of different pitches.

Of the grooves of the screw, the groove near a distal end may have a smaller pitch than the groove near a rear end.

The cereal flour according to a third exemplary aspect of the present disclosure is obtained by the milling method for cereals according to the second exemplary aspect of the present disclosure.

The cereal flour according to a fourth exemplary aspect of the present disclosure penetrates and adsorbs into kneaded food powder to prepare dough from the food powder.

The food product according to a fifth exemplary aspect of the present disclosure contains the cereal flour according to the third exemplary aspect of the present disclosure or the cereal flour according to the fourth exemplary aspect of the present disclosure.

The adhesive according to a sixth exemplary aspect of the present disclosure contains the cereal flour according to the third exemplary aspect of the present disclosure.

Advantageous Effects of Invention

The present disclosure can provide a milling device, milling method, cereal flour, food product, and adhesive making it possible to grind and blast cereal grains in a short time and at a low cost.

DESCRIPTION OF EMBODIMENTS

An embodiment of the present disclosure will be described in detail hereafter.

First, a milling device 100 according to an embodiment of the present disclosure will be described.

The milling device 100 according to an embodiment of the present disclosure is a device grinding and then blasting cereal grains to produce cereal flour. The obtained cereal flour can be kneaded along with an existing food powder to prepare dough from the food powder or used for imparting viscosity to a food product, or used as a raw material of adhesives as described later.

In this specification, "cereal grains" means cereal grains having a largest diameter of 0.5 mm to 15.0 mm and include, but are not limited to, rice, wheat, barley, rye, corn, non-glutinous millet, white sorghum, tuber and corm crops (potatoes, cassavas, taros, yuccas, and the like). When tuber and corm crops are used, for example, tuber and corm crops are cut into cubes of 1.0 mm to 10.0 mm to use as cereal grains provided that the water content is 10 to 30%. Any cereal grain yielding the efficacy of the present disclosure can be selected as appropriate.

Moreover, the term "grinding" in this specification means crushing cereal grains in a space between a rotatable screw in the outer periphery of which spiral grooves are formed and a barrel surrounding the portion of the screw where the spiral grooves are formed and in the inner periphery of which a spiral groove is formed by way of rotation of the screw as described later.

Moreover, the term "blasting" in this specification means breaking cereal grains into multiple fragments by ejecting cereal grains pressurized in a nearly airtight state in a given nearly closed space through a small-diameter discharge port from the nearly closed space as described later.

Figure 1:
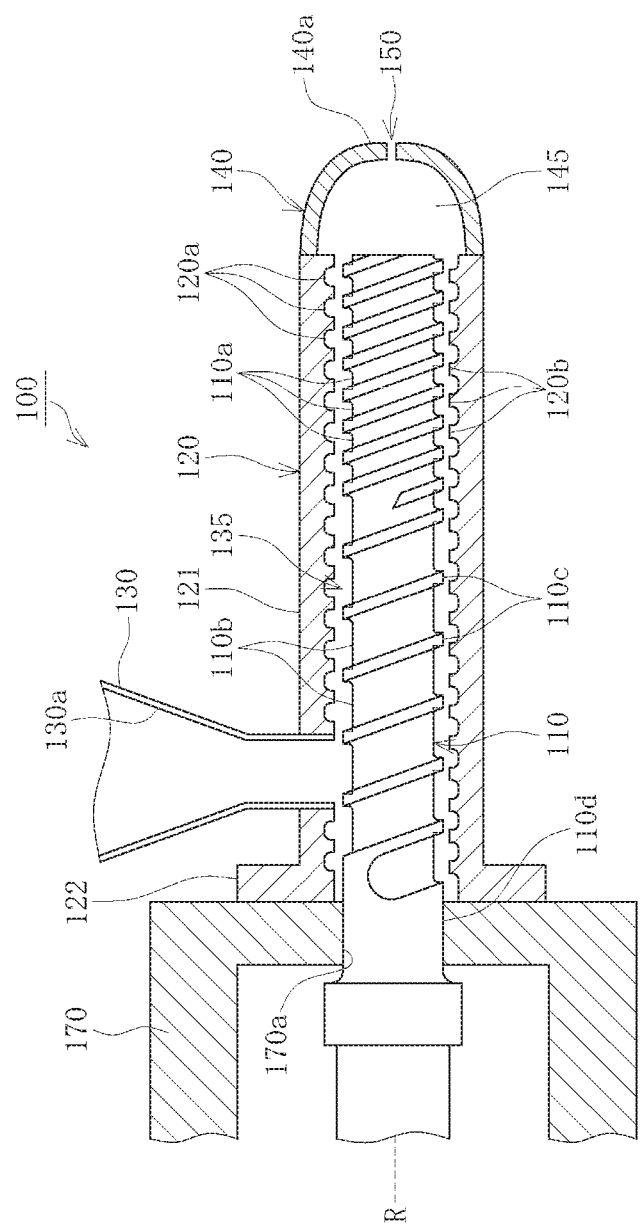
FIG. 1 is a side view schematically presenting the internal structure of the milling device that is an embodiment of the present disclosure.

As shown in FIG. 1, the milling device 100 according to the embodiment of the present disclosure comprises a screw 110, a barrel 120, a loader 130, a compressor 140, a discharge port 150, and a bearing 170. For easier understanding of the internal structure of the milling device 100, FIG. 1 shows the components in a cross-section parallel to the figure except for the screw 110.

The screw 110 has a nearly columnar shape and is driven by a driving device (not shown) attached to the rear end (the following explanation will be made on the assumption that the back of the milling device 100 is on the left and the front of the milling device 100 is on the right in FIG. 1) to rotate about the rotation axis R. The screw 110 is driven by the driving device (not shown) to rotate counterclockwise when the milling device 100 is seen from the back. A first groove 110a and a second groove 110b, which are spiral and different in pitch, are formed in the outer periphery of the screw 110. The first groove 110a is a spiral groove of a pitch P1 (FIG. 2) provided over a given range from the distal end (the right end in FIG. 1) of the screw 110. The second groove 110b is a spiral groove formed with a pitch P2 (FIG. 2) larger than the pitch P1 of the first groove 110a over a given range on the rear side of the first groove 110a.

Figure 2:
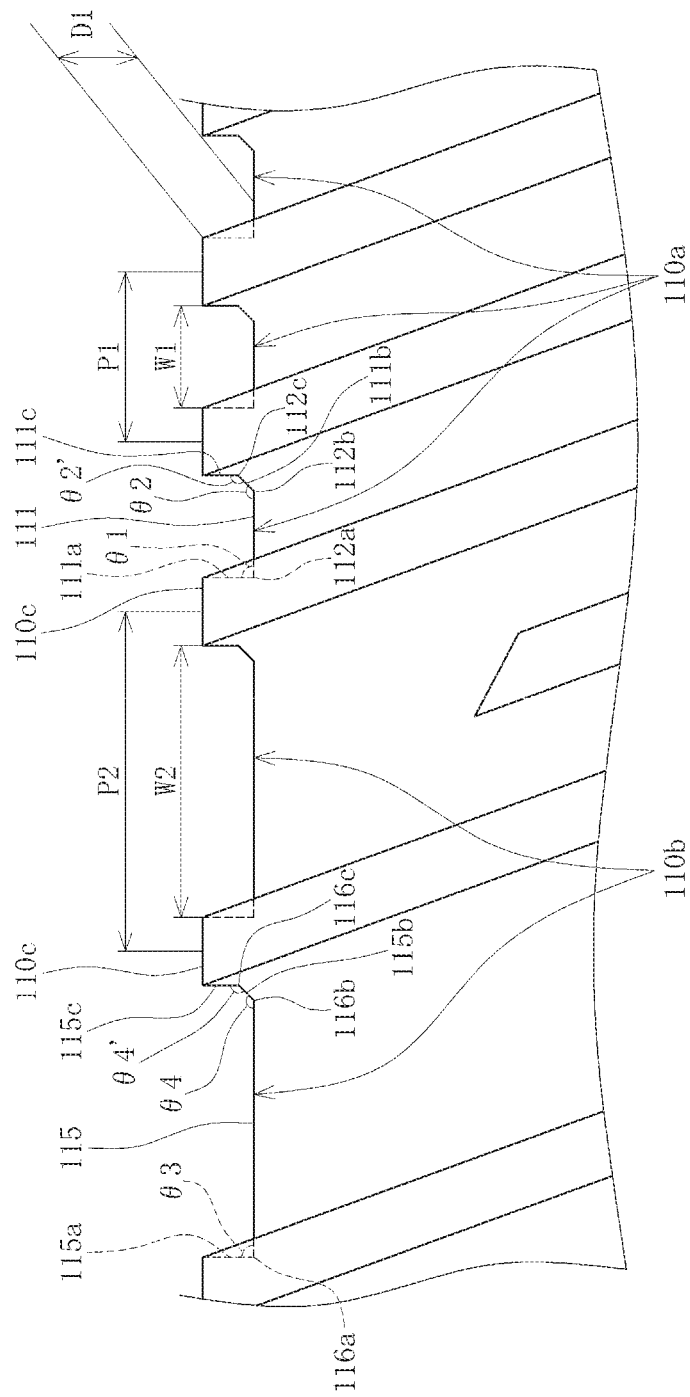
FIG. 2 is a partial side view of the screw focusing on the grooves formed in the outer periphery of the screw.

The first groove 110a comprises, as shown in FIG. 2, a first bottom surface 111, a first lateral surface 111a rising from one side of the first bottom surface 111, a second lateral surface 111b rising from the other side of the first bottom surface 111, and a third lateral surface 111c rising from the opposite side of the second lateral surface 111b to the first bottom surface 111. The first lateral surface 111a rises from the first bottom surface 111 at an intersection angle $\theta 1$ and a non-rounded first edge 112a is formed at the intersection. The second lateral surface 111b rises from the first bottom surface 111 at an intersection angle $\theta 2$ and a non-rounded second edge 112b is formed at the intersection. The third lateral surface 111c rises from the second lateral surface 111b at an intersection angle $\theta 2'$ and a non-rounded third edge 112c is formed at the intersection. The intersection angle $\theta 1$ is smaller than the intersection angles $\theta 2$ and $\theta 2'$, and $\theta 1=90$ degrees and $\theta 2=\theta 2'=135$ degrees in this embodiment. Using $\theta 1=90$ degrees, ground cereal grains can effectively be crammed and pressurized in the compressor 140 as described later. Moreover, using $\theta 2=\theta 2'=135$ degrees, the loaded cereal grains can be fed into a groove 120a of the barrel 120 as described later.

The second groove 110b comprises, as shown in FIG. 2, a second bottom surface 115, a fourth lateral surface 115a rising from one side of the second bottom surface 115, a fifth lateral surface 115b rising from the other side of the second bottom surface 115, and a sixth lateral surface 115c rising from the opposite side of the fifth lateral surface 115b to the second bottom surface 115. The fourth lateral surface 115a rises from the second bottom surface 115 at an intersection angle $\theta 3$ and a non-rounded fourth edge 116a is formed at the intersection. The fifth lateral surface 115b rises from the second bottom surface 115 at an intersection angle $\theta 4$ and a non-rounded fifth edge 116b is formed at the intersection. The sixth lateral surface 115c rises from the fifth lateral surface 115b at an intersection angle $\theta 4'$ and a non-rounded sixth edge 116c is formed at the intersection. The intersection angle θ3 is smaller than the intersection angles θ4 and θ4', and θ3=90 degrees and θ4=θ4'=135 degrees in this embodiment. Using θ3=90 degrees, ground cereal grains can effectively be crammed and pressurized in the compressor 140 as mentioned above. Moreover, using θ4=θ4'=135 degrees, the loaded cereal grains can be fed into the groove 120a of the barrel 120 as mentioned above.

As described above, the screw 110 is not of a flat cut type but one on which the first groove 110a and the second groove 110b each having non-rounded edges are formed.

Driven by the above-mentioned driving device (not shown), the screw 110 rotates to grind cereal grains together with the barrel 120 as described later. Here, by making the pitch P1 of the first groove 110a smaller than the pitch P2 of the second groove 110b as described above, it is possible to increase the pressing force on the cereal grains near the distal end of the screw 110. The second groove 110b has a width W2 (FIG. 2) of 15.0 mm to 27.0 mm and the first groove 110a has a width W1 (FIG. 2) of 4.0 mm to 14.0 mm. The first groove 110a and the second groove 110b individually have a depth D1 (FIG. 2) of 5.0 mm to 15.0 mm.

Figure 3:
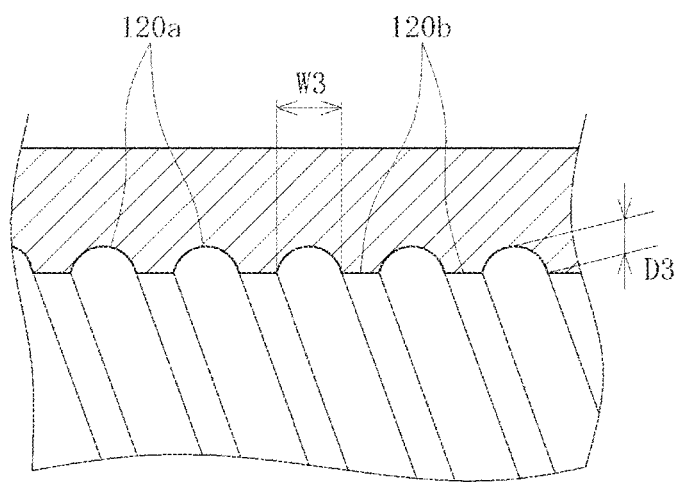
FIG. 3 is a partial cross-sectional view of the barrel focusing on the groove formed in the inner periphery of the barrel.
Figure 4:
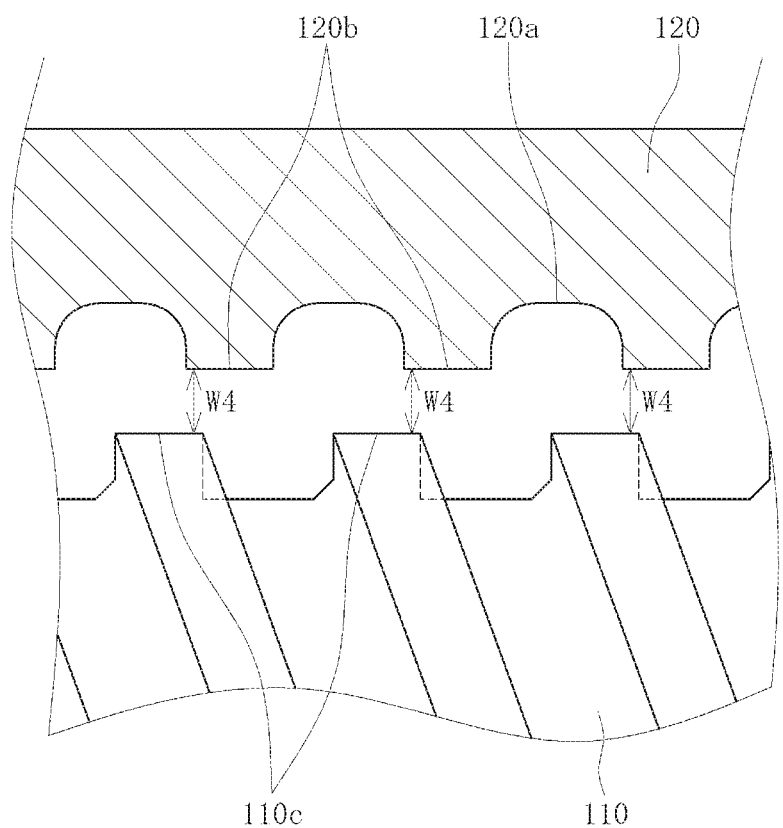
FIG. 4 is a partial side view schematically presenting the space between the screw and the barrel.

The barrel 120 has a nearly cylindrical tube 121 and a flange 122 provided at the end of the tube 121 and fixed to the bearing 170. The barrel 120 (flange 122) and the bearing 170 can be fixed by a known method such as bolting and welding. The barrel 120 houses the screw 110 in part in an inner space making the tube 121 and the flange 122 communicate. As a result, the portion of the screw 110 where the first groove 110a and the second groove 110b are formed is surrounded by the barrel 120. As shown in FIG. 3, a spiral groove 120a is formed in the inner periphery of the barrel 120. The groove 120a plays the role of grinding cereal grains together with the screw 110. Presence of the groove 120a serves to increase the friction between the cereal grains and the inner periphery of the barrel 120, whereby the cereal grains can efficiently be ground. The groove 120a has a depth D3 (FIG. 3) of 0.2 mm to 2.0 mm. Moreover, as shown in FIG. 3, the groove 120a has a semicircular cross-section of which the diameter (the width W3 of the groove 120a) is 4.0 mm to 14.0 mm. Here, although depending on what size the cereal grains should be ground to, a space 135 between the screw 110 and the barrel 120 preferably has a minimum value of 0.2 mm to 2.0 mm. Here, the minimum value of the space 135 is a width W4 (FIG. 4) between the tops of ridges 110c (FIGS. 1 and 2) formed on the outer periphery of the screw 110 and the tops of ridges 120b (FIGS. 1 and 3) formed on the inner periphery of the barrel 120.

The bearing 170 holds the flange 122 of the barrel 120 and rotatably supports the screw 110. The bearing 170 has a bearing surface 170a and is in charge of a force from a journal 110d of the inserted screw 110. As a result, the screw 110 is rotatably supported by the bearing 170, and the screw 110 can stably rotate without wobbling.

The loader 130 is provided for loading cereal grains into the space 135 between the screw 110 and the barrel 120. The loader 130 has a loading opening 130a penetrating the tube 121 of the barrel 120 from the outer surface and communicating with the interior of the barrel 120. Here, the loader 130 is attached at the rear end of the barrel 120. Cereal grains loaded into the space 135 via the loader 130 are ground in the space 135 by the rotating screw 110. More specifically, first, the loaded cereal grains enter the first groove 110a and the second groove 110b of the screw 110 and the groove 120a of the barrel 120. Then, as the ridges 110c formed on the screw 110 shift along with rotation of the screw 110, the cereal grains having entered the groove 120a of the barrel 120 are crushed by the ridges 110c. Moreover, the cereal grains having entered the first groove 110a and the second groove 110b shift as the ridges 110c shift and are crushed by the ridges 120b formed on the barrel 120. The cereal grains ground in the space 135 as described above are gradually fed into the interior of the compressor 140 (described later) by the ridges 110c shifting along with rotation of the screw 110.

The compressor 140 is provided at the distal end of the barrel 120 as shown in FIG. 1. The ground cereal grains are gradually fed into a compressor's interior 145 (a nearly closed space) that is the interior space of the compressor 140 by the rotating screw 110. The cereal grains fed in by the rotating screw 110 are accumulated and crammed and pressurized in a nearly airtight state in the compressor's interior 145.

Moreover, the discharge port 150 for discharging the cereal grains fed into the compressor's interior 145 is provided in a front face 140a of the compressor 140. The discharge port 150 is nearly circular when seen from in front of the milling device 100 and provided nearly at the center of the front face 140a of the compressor 140 so as to communicate with the compressor's interior 145. The cereal grains crammed and pressurized in a nearly airtight state in the compressor's interior 145 are ejected from the discharge port 150 and thereby blasted. In other words, the cereal grains are broken into multiple fragments by the pressure during ejection. While the screw 110 is rotating, the cereal grains are continuously ejected from the discharge port 150, whereby the cereal grains are constantly blasted. Here, the diameter of the discharge port 150 is set to a size that makes it possible for the fed-in cereal grains to sufficiently increase the pressure in the compressor's interior 145. Therefore, although depending on the size of cereal grains to mill, the diameter of the discharge port 150 is desirably 5.0 mm to 10.0 mm. As a result, ejected from the compressor's interior 145 in which the pressure is sufficiently increased via the discharge port 150, the cereal grains can be broken into multiple fragments. Here, the discharge port 150 may have a rectangular shape when seen from in front of the milling device 100.

With the milling device 100 according to the embodiment of the present disclosure, cereal grains are ground by the screw 110 on which the first groove 110a and the second groove 110b each having non-rounded edges are formed and blasted through ejection from the discharge port 150, whereby cereal flour having an angular shape and usable for imparting viscosity to a food product or as a raw material of adhesives as described later can be obtained.

Moreover, with the milling device 100 according to the embodiment of the present disclosure, cereal grains are continuously ground and blasted by way of rotation of the screw 110, whereby desired cereal flour can be produced in a short time.

Moreover, with the milling device 100 according to the embodiment of the present disclosure, desired cereal flour can be produced without undergoing complex steps and at a low cost because no chemicals are necessary.

Moreover, in the milling device 100 according to the embodiment of the present disclosure, the spiral groove 120a is formed in the inner periphery of the barrel 120, whereby the friction between the cereal grains and the inner periphery of the barrel 120 can effectively be increased, whereby cereal grains can efficiently be ground.

Moreover, in the milling device 100 according to the embodiment of the present disclosure, milling can be done without using chemicals as described above, whereby cereal flour highly safe to the human body can be obtained.

The present disclosure is not confined to the above-described embodiment and various modifications and applications are available. For example, as shown in FIG. 1, the mode in which the rounded groove 120a is formed in the inner periphery of the barrel 120 is described above. However, the groove formed in the inner periphery of the barrel 120 may have non-rounded edges.

Moreover, as shown in FIG. 1, the mode in which the groove 120a having a nearly uniform width and depth is formed in the inner periphery of the barrel 120 is described above. However, the groove formed in the inner periphery of the barrel 120 may have the width and depth reduced gradually toward the distal end.

Moreover, as shown in FIG. 1, the mode in which the second groove 110b and the first groove 110a having a width smaller than the second groove 110b are formed in the outer periphery of the screw 110 is described above. However, the groove pitch of the screw 110 may be reduced gradually or grooves of nearly the same pitch may be formed in the outer periphery of the screw 110.

Moreover, the barrel 120 and/or the compressor 140 may be provided with a temperature adjusting device (for example, a heater) for adjusting the temperature in the milling process.

The milling method and cereal flour according to the present disclosure will be described hereafter.

The milling method according to the present disclosure includes the following steps:
  (i) grinding cereal grains in a space between the rotatable screw 110 in the outer periphery of which spiral grooves are formed and the barrel 120 surrounding the portion of the screw 110 where the spiral grooves are formed and in the inner periphery of which a spiral groove is formed by way of the screw 110 and the barrel 120;
  (ii) blasting the ground cereal grains; and
  (iii) pulverizing the blasted cereal grains.

Details of the cereal grains used in step (i) are as described above. Details of the screw 110 and the barrel 120 are also as described above. The grooves formed in the outer periphery of the screw 110 have non-rounded edges (FIG. 2) as described above. Moreover, the space 135 between the screw 110 and the barrel 120 is also as described above.

The blasting method in step (ii) can include, for example, cramming and pressurizing in the compressor's interior 145 and ejecting from the discharge port 150 the cereal grains ground in step (i). Any blasting method yielding the efficacy of the present disclosure can be selected as appropriate.

The pulverizing method in step (iii) can be a known pulverizing means. For example, a pin mill pulverizer may be used to break the cereal grains blasted in step (ii) into smaller fragments. Any pulverizing method yielding the efficacy of the present disclosure can be selected as appropriate.

Contained in a food product, the cereal flour according to the present disclosure can impart viscosity to the food product, and be used as a so-called thickener for increasing the viscoelasticity of a food product. For example, the cereal flour according to the present disclosure can be kneaded along with an existing food powder to prepare dough from the food powder or mixed with a liquid food product (such as a dressing) to impart viscosity. Preferably, the cereal flour according to the present disclosure is among those pulverized to grain sizes of 75% passing through a 180 mesh to 80% passing through a 200 mesh for kneading along with an existing food powder to prepare dough from the food powder. Moreover, those pulverized smaller than the above described grain sizes can preferably be used for mixing in liquid food products (such as dressings).

In the case of kneading the cereal flour according to the present disclosure along with an existing food powder to prepare dough from the food powder, the existing food powder can be, for example, corn powder, white sorghum powder, rice powder, potato powder (potato starch and the like), cassava powder, non-glutinous millet powder, various kinds of starches (tapioca starch and the like), raw okara (soy pulp), and a mixture of these. Moreover, mixed with the cereal flour according to the present disclosure, weak flour as an existing food powder can have the viscoelasticity increased to a nearly equal level to all-purpose flour or hard flour. Kneaded along with the cereal flour according to the present disclosure, an existing food powder can be given desired viscoelasticity to prepare dough for breads, pastas, dumpling wrappers, cakes, pizza crusts, udon noodles, takoyaki (octopus balls), donuts, and the like. Any existing food powder yielding the efficacy of the present disclosure can be selected as appropriate. Moreover, although depending on the type of an existing food powder and the food product to produce, the cereal flour according to the present disclosure and existing food powder are mixed at a ratio of, for example, the cereal flour according to the present disclosure:the existing food powder=1:2.5 to 2:98, and preferably the cereal flour according to the present disclosure:the existing food powder=1:3 to 1:15.

The cereal flour according to the present disclosure can penetrate and adsorb to an existing food powder to knead along with (penetration adsorption). Details are given below. Powders obtained by the prior art milling method are rounded in shape such as spherical or ellipsoidal and therefore interfacially adsorb to an existing food powder to knead along with (interface adsorption). Consequently, the powders obtained by the prior art milling method fall off after kneaded along with an existing food powder for a specific length of time, and the viscosity significantly decreases, whereby it is difficult to prepare dough from the food powder. On the other hand, the cereal flour obtained by the milling method according to the present disclosure has an angular shape resulting from being ground with a screw on which the grooves having non-rounded edges are formed and blasted, and therefore can penetrate and adsorb to an existing food powder to knead along with. Consequently, the cereal flour obtained by the milling method according to the present disclosure does not fall off after kneaded along with an existing food powder for a long time, whereby it is possible to keep entanglement between the food powder particles, not decrease the viscosity, and efficiently prepare dough from the food powder in a short time.

The cereal flour according to the present disclosure is milled by physical means such as grinding and blasting without using chemicals and the like. For this reason, the cereal flour according to the present disclosure is highly safe to the human body and can be used in food safely. Moreover, since the cereal flour according to the present disclosure itself works as a thickener, there is no need of adding to a food product other thickeners such as curdlan, xanthan gum, and guar gum. Moreover, the cereal flour according to the present disclosure can be milled in a short time and at a low cost as described above.

Moreover, the cereal flour according to the present disclosure can be used as a raw material of adhesives. The adhesives can be produced by mixing the cereal flour according to the present disclosure and water at a given water multiplying ratio (the ratio by weight of water to mix with the cereal flour) and kneading for approximately 30 to 180 seconds. The adhesives containing the cereal flour according to the present disclosure can be used as adhesives for paper such as cardboard and craft paper, adhesives for construction materials such as wood and plywood, adhesives for shaping coke fuel and briquette coal, and the like. Here, the above water multiplying ratio is changed as appropriate according to the application of the adhesive, and can be, for example, 3.0 to 6.0 in the case of adhesives for paper.

Containing the cereal flour having an angular shape as described above, the adhesives containing the cereal flour according to the present disclosure exhibit excellent adhesive strength.

Moreover, the adhesives containing the cereal flour according to the present disclosure can be produced without undergoing a multistep production process, and therefore are produced in a short time and at a low cost. Moreover, the adhesives containing the cereal flour according to the present disclosure can be produced without using chemicals and the like, and therefore are produced at a low cost.

Moreover, the prior art adhesives require temperature control in the production process. On the other hand, the adhesives containing the cereal flour according to the present disclosure can easily be produced simply by mixing the cereal flour and water and does not require temperature control in the production process.

Moreover, in recent years, how to treat radiation contaminated cereals is an issue. For example, it is possible to produce an adhesive using the cereal flour according to the present disclosure made from radiation contaminated rice. As described above, the adhesives containing the cereal flour according to the present disclosure allows for effective use of radiation contaminated cereals.

PRACTICAL EXAMPLES

Practical Example 1

Cereal flours ground and blasted in the milling device illustrated in FIG. 1 and pulverized in a pin mill pulverizer were kneaded along with an existing food powder and tested for viscosity.

The cereal flours and existing food powders used in the viscosity test were as follows.
(1) Existing food powders [i] to [v] (without cereal flour);
(2) Cereal flour made from rice (product of Japan)+an existing food powder [i] to [v];
(3) Cereal flour made from corn (product of the USA)+an existing food powder [i] to [v];
(4) Cereal flour made from white sorghum (product of the USA)+an existing food powder [i] to [v]; and
(5) Cereal flour made from potatoes (cut into 5 mm cubes provided that the water content is 15 to 30%) (product of Japan)+an existing food powder [i] to [v].

The following five existing food powders were used:
(i) Rice powder (200 mesh (grain size 74 μm)) (product of Japan);
(ii) Corn powder (20% flour, 80% reduction) (120 mesh (grain size 125 μm)) (product of the USA);
(iii) White sorghum powder (120 mesh (grain size 125 μm)) (product of the USA);
(iv) Non-glutinous millet powder (120 mesh (grain size 125 μm)) (product of China); and
(v) Corn starch (product of the USA).

As for the above (1) (the existing food powders [i] to [v] (without cereal flour)), 30 g of each of the above food powders [i] to [v]) were kneaded in a mixer for one minute with the addition of 150 mL of water. Subsequently, the viscosities of the samples were measured using a viscometer (Viscometer Model No. DV-E (manufactured by Brookfield), a spindle: LV Spindle Model No. LV-4 (64), Maximum CP 12,000).

As for the above (2) to (5), 50 g of a mixed powder consisting of 10 g of each cereal flour and 40 g of each of the above food powders [i] to [v] was kneaded in a mixer for one minute with the addition of 100 mL of water. Subsequently, the viscosities of the samples were measured using the same viscometer as described above.

Table 1 shows the results. The viscosity was zero in the above (1) (without cereal flour) while excellent viscosities were observed with the samples in the above (2) to (5) (with cereal flour) regardless of the type of the kneaded existing food powder. The above results suggested that the cereal flour obtained by the milling device according to the embodiment can maintain an excellent viscosity after kneaded along with an existing food powder for a specific length of time and make it possible to efficiently prepare dough from the food powder.

TABLE 1

| | Food powder | | | | |
|---|---|---|---|---|---|
| Cereal flour | [i] Rice powder | [ii] Corn powder | [iii] White *sorghum* powder | [iv] Non-glutinous millet powder | [v] Corn starch |
| (1) Without cereal flour | 0 | 0 | 0 | 0 | 0 |
| (2) Rice | 1,490 | 3,340 | 3,500 | 1,480 | 400 |
| (3) Corn | 1,960 | 6,470 | 4,300 | 2,540 | 540 |
| (4) White *sorghum* | 2,110 | 6,650 | 4,320 | 1,760 | 440 |
| (5) Potatoes | 4,020 | 12,000 | 12,000 | 3,320 | 560 |

Practical Example 2

Using cereal flours ground and blasted in the milling device in FIG. 1 and pulverized in a pin mill pulverizer, various food products were produced as below.

Production of Bread

An amount of 16 g of cereal flour made from rice (Japonica rice, product of Japan or Indica rice, product of Thailand) ground and blasted in the milling device in FIG. 1 and pulverized in a pin mill pulverizer, 84 g of rice powder, 100 g of tapioca starch, 14 g of sugar, 3.3 g of salt, 7 g of dry yeast, and 201.6 g of water were mixed (the kneading temperature: 20° C.) and placed in a pan of 12 cm in diameter and 5 cm in height to approximately one third thereof. Degassing by dropping was followed by fermentation at 24° C. The dough was left to ferment and rise to approximately eight tenths of the pan and baked at 220° C. for 30 minutes.

The bread obtained as described above was soft and excellent in both taste and texture.

Production of Pizza Crust

An amount of 8 g of cereal flour made from rice (Japonica rice, product of Japan or Indica rice, product of Thailand) ground and blasted in the milling device in FIG. 1 and pulverized in a pin mill pulverizer, 42 g of rice powder, 50 g of tapioca starch, 7 g of sugar, 1.7 g of salt, 3 g of dry yeast, and 100.8 g of water were mixed (the kneading time: 5 minutes) to prepare dough. The dough was flattened to a thickness of approximately 3 mm and left to ferment at room temperature for 10 minutes. Subsequently, the dough was baked at 220° C. for 10 minutes.

The pizza crust obtained as described above was soft and excellent in both taste and texture.

Production of Cookies

An amount of 50 g of granulated sugar was added to 50 g of creamed margarine little by little and mixed well. An amount of 50 g of lightly whipped egg white was added in three divided portions and mixed well. A mixture of 4 g of cereal flour made from rice (Japonica rice, product of Japan or Indica rice, product of Thailand) ground and blasted in the milling device in FIG. 1 and pulverized in a pin mill pulverizer, 21 g of rice powder, and 25 g of tapioca starch were mixed in through a sieve to prepare dough. The dough was introduced in a pastry bag, squeezed out on a baking sheet, and baked at 180° C. for 20 minutes.

The cookies obtained as described above were crisp and excellent in both taste and texture.

Production of Muffins

An amount of 48 g of granulated sugar was added to 30 g of creamed margarine little by little and mixed well. An amount of 40 g of well beaten whole egg was added in three divided portions and mixed well. A mixture of 7.2 g of cereal flour made from rice (Japonica rice, product of Japan or Indica rice, product of Thailand) ground and blasted in the milling device in FIG. 1 and pulverized in a pin mill pulverizer, 28.8 g of rice powder, and 36 g of tapioca starch was mixed in three divided portions and then 33 g of milk was mixed in to prepare dough. The dough was introduced in a muffin pan and baked at 200° C. for 20 minutes.

The muffins obtained as described above were soft and excellent in both taste and texture.

Production of Noodles

An amount of 250 g of cereal flour made from corn (Dent corn, product of the USA) ground and blasted in the milling device in FIG. 1 and pulverized in a pin mill pulverizer, 750 g of tapioca starch, and 450 g of water (the water temperature 23° C.) were kneaded to obtain noodle dough. The noodle dough was applied on a noodle maker to obtain noodles of 1.6 mm in diameter. The obtained noodles were cooked for two minutes, rinsed in a cold water, and drained.

The noodles obtained as described above were excellent in both consistency and firmness to the bite. Here, because no wheat flour is used, people allergic to wheat flour can eat the noodles obtained as described above.

Production of Potato Starch Bread

An amount of 25 g of cereal flour made from potatoes (product of Japan) (cut into 5 mm cubes provided that the water content is 15 to 30%) ground and blasted in the milling device in FIG. 1 and pulverized in a pin mill pulverizer, 75 g of potato starch, 7.05 g of sugar, 1.69 g of salt, 3.0 g of yeast, and 78.5 g of water were mixed (the kneading temperature: 20° C.) and placed in a pan of 12 cm in diameter and 5 cm in height to approximately one third thereof. Degassing by dropping was followed by fermentation at 24° C. The dough was left to ferment and rise to approximately eight tenths of the pan and baked at 220° C. for 30 minutes.

The bread obtained as described above was soft and excellent in both taste and texture.

Production of Potato Starch Pizza Crust

An amount of 17.6 g of cereal flour made from potatoes (product of Japan) (cut into 5 mm cubes provided that the water content is 15 to 30%) ground and blasted in the milling device in FIG. 1 and pulverized in a pin mill pulverizer, 82.4 g of potato starch, 7.05 g of sugar, 1.69 g of salt, 3.0 g of dry yeast, and 98.9 g of water were mixed (the kneading temperature: 20° C.) to prepare dough. The dough was flattened to a thickness of approximately 3 mm and left to ferment at room temperature for 10 minutes. Then, the dough was baked at 220° C. for 10 minutes.

The pizza crust obtained as described above was soft and excellent in both taste and texture.

Production of Okara Mix

An amount of 200 g of cereal flour made from rice (Japonica rice, product of Japan or Indica rice, product of Thailand) ground and blasted in the milling device in FIG. 1 and pulverized in a pin mill pulverizer and 800 g of raw okara were kneaded, flattened to a thickness of 2 mm, cut into pieces of 60 mm×15 mm, and fried in a food oil heated to 180° C. for six minutes.

The fried okara mix obtained as described above was crisp in texture and excellent in taste.

Practical Example 3

Using cereal flours ground and blasted in the milling device in FIG. 1 and pulverized in a pin-mil pulverizer, adhesives were produced as follows.

Adhesive with cereal flour from cassava potatoes

An amount of 100 g of cereal flour made from cassava potatoes (product of Vietnam) (cut into 1 to 9 mm cubes provided that the water content is 27%) ground and blasted in the milling device in FIG. 1 and pulverized in a pin mill pulverizer was kneaded in a mixer for 60 seconds with the addition of 500 g of purified water of 23° C. to obtain a paste-like adhesive. The adhesive was thinly applied to one half of a craft paper of 30 cm×30 cm and the other half of the craft paper where no adhesive was applied was folded over so that the craft papers were bonded together.

The craft papers bonded together with the adhesive were dried at room temperature and the adhesive strength was checked. Consequently, the attempt to separate the craft papers bonded together with the adhesive by hand failed. Thus, it was suggested that the adhesive according to this practical example can exert excellent adhesive strength when used on craft paper.

Moreover, the adhesive obtained as described above was stored in a refrigerator (the inside temperature: 7° C.) for 24 hours and the adhesive strength when applied to a craft paper as described above was checked. Consequently, the attempt to separate the craft papers bonded together with the adhesive by hand failed as in the above case. Thus, it was suggested that the adhesive according to this practical example can exert excellent adhesive strength after being stored in a cold place for a specific length of time.

Adhesive with Cereal Flour from Sorghum

Cereal flour made from sorghum (product of the USA) ground and blasted in the milling device in FIG. 1 and pulverized in a pin mill pulverizer was tested in the same manner as the above adhesive with cereal flour from cassava potatoes. However, the adhesive was produced with a water multiplying ratio of 4.2. As a result of checking the adhesive strength, it was suggested that the adhesive can similarly exert excellent adhesive strength.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The present application is based on Japanese Patent Application No. 2013-233198, filed on Nov. 11, 2013, of which the specification, scope of claims, and drawings were entirely incorporated herein by reference.

REFERENCE NUMBERS LIST

100 Milling device
110 Screw
110a First groove
110b Second groove
110c Ridge
110d Edge
111 First bottom surface
111a First lateral surface
111b Second lateral surface
111c Third lateral surface
112a First edge
112b Second edge
112c Third edge
115 Second bottom surface
115a Fourth lateral surface
115b Fifth lateral surface
115c Sixth lateral surface
116a Fourth edge
116b Fifth edge
116b Sixth edge
120 Barrel
120a Groove
120b Ridge
121 Tube
122 Flange
130 Loader
130a Loading opening
135 Space
140 Compressor
140a Front face
145 Compressor's interior
150 Discharge port
170 Bearing
170a Bearing surface

The invention claimed is:

1. A milling device, comprising:
a rotatable screw in an outer periphery of which spiral grooves are formed wherein the grooves of the screw comprise a bottom surface, two lateral surfaces rising at given angles from the bottom surface, and a lateral surface rising at a given angle from at least one of the two lateral surfaces;
a barrel surrounding the portion of the screw where the spiral grooves are formed and in an inner periphery of which a spiral groove is formed;
a loader for loading cereal grains into a space between the screw and the barrel;
a compressor attached to a distal end of the barrel and accumulating and pressurizing in a nearly airtight state the cereal grains ground in the space and fed therein as the screw rotates; and
a discharge port provided in a front face of the compressor and blasting the cereal grains fed in and pressurized by way of rotation of the screw.

2. The milling device according to claim 1, wherein non-rounded edges are formed on the grooves of the screw.

3. The milling device according to claim 1, wherein the grooves of the screw comprise grooves of different pitches.

4. The milling device according to claim 3, wherein of the grooves of the screw, the groove near the distal end has a smaller pitch than the groove near a rear end.

* * * * *